US008687696B2

(12) United States Patent
Thoreau et al.

(10) Patent No.: US 8,687,696 B2
(45) Date of Patent: Apr. 1, 2014

(54) DERIVATION OF FRAME/FIELD ENCODING MODE FOR A PAIR OF VIDEO MACROBLOCKS

(75) Inventors: Dominique Thoreau, Cesson Sevigne (FR); Franck Hiron, Chateaubourg (FR); Yannick Olivier, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 1246 days.

(21) Appl. No.: 12/223,434

(22) PCT Filed: Jan. 31, 2007

(86) PCT No.: PCT/EP2007/050959
§ 371 (c)(1),
(2), (4) Date: Jul. 30, 2008

(87) PCT Pub. No.: WO2007/090780
PCT Pub. Date: Aug. 16, 2007

(65) Prior Publication Data
US 2009/0016439 A1  Jan. 15, 2009

(30) Foreign Application Priority Data
Feb. 8, 2006  (FR) ...................... 06 50452

(51) Int. Cl.
*H04N 7/26* (2006.01)
(52) U.S. Cl.
USPC .................................................. 375/240.16
(58) Field of Classification Search
USPC .......................... 375/240.01–240.29
IPC ................................................ H04N 7/12
See application file for complete search history.

(56) References Cited

U.S. PATENT DOCUMENTS

2005/0129120 A1   6/2005   Jeon
2005/0147169 A1   7/2005   Wang et al.

OTHER PUBLICATIONS

Joint Video Team (JVT) of ISO/IEC MPEG & ITU-T VCEG 3rd meeting in Fairfax, Virginia, USA, May 6-8, 2002 (JVT-C039.doc).*
Xiangyang Ji et al. "New scaling technique for direct mode coding in B pictures" Image Processing, 2004, ICIP '04. 2004 International Conference on Singapore Oct. 24-27, 2004, IEEE, vol. 1, Oct. 24, 2004, pp. 469-472, XP010784856.

(Continued)

*Primary Examiner* — Jay Patel
*Assistant Examiner* — Neil Mikeska
(74) *Attorney, Agent, or Firm* — Tutunjian & Bitetto, P.C.

(57) ABSTRACT

The method wherein the field or frame mode is selected according to the following steps:
 determination of a motion vector associated with a co-located macroblock of a macroblock to be coded and finding in the next reference picture, a predefined macroblock to be coded, for the selection, in field or frame mode,
 scaling of the motion vector according to the temporal distances between the reference pictures corresponding to this motion vector and between the current picture, field or frame, according to a predefined mode and a reference picture chosen from among the reference pictures corresponding to this motion vector,
 determination of the temporal macroblock in the chosen reference picture, designated by the motion vector scale attributed to the macroblock to be coded, and its field or frame coding mode,
 selection of field or frame coding mode of the temporal macroblock for the coding of the current macroblock.
The applications relate to the compression of data using for example the MPEG4 part 10 standard.

8 Claims, 2 Drawing Sheets

(56) References Cited

OTHER PUBLICATIONS

M.A. Guerrero et al. "Fast Macroblock-Adaptive Frame/Field Coding Selection in H.264" Project Report, EE398—Image and Video Compression, Mar. 8, 2005, pp. 1-6, XP002396280, Standford center for Image Systems Engineering.

Y J Liang et al: "Low-complexity intra/inter mode-decision for H.264/AVC video coder" Intelligent Multimedia, Video and Speech Processing, 2004, Proceedings of 2004 International Symposium on Hong Kong, China Oct. 20-22, 2004, IEEE, Oct. 20, 2004, pp. 53-56, XP010801382.

A. Puri et al. : "Video coding using the H.264/MPEG-4 AVC compression standard", Signal Processing. Image Communication, vol. 19, No. 9, Oct. 2004, pp. 793-849, XP004607150.

Search Report Dated Mar. 6, 2007.

* cited by examiner

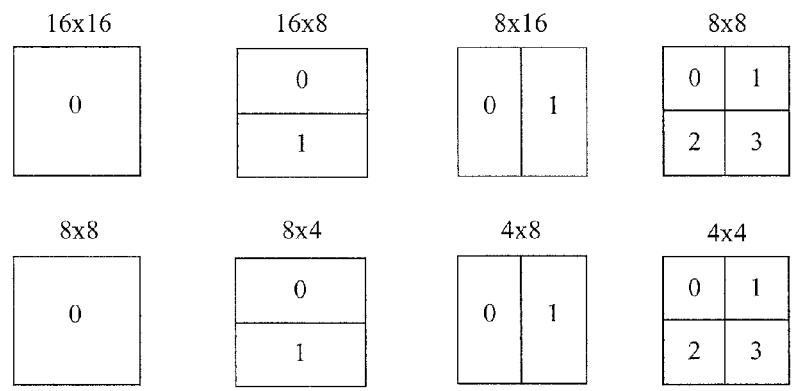
FIG.1 – PRIOR ART
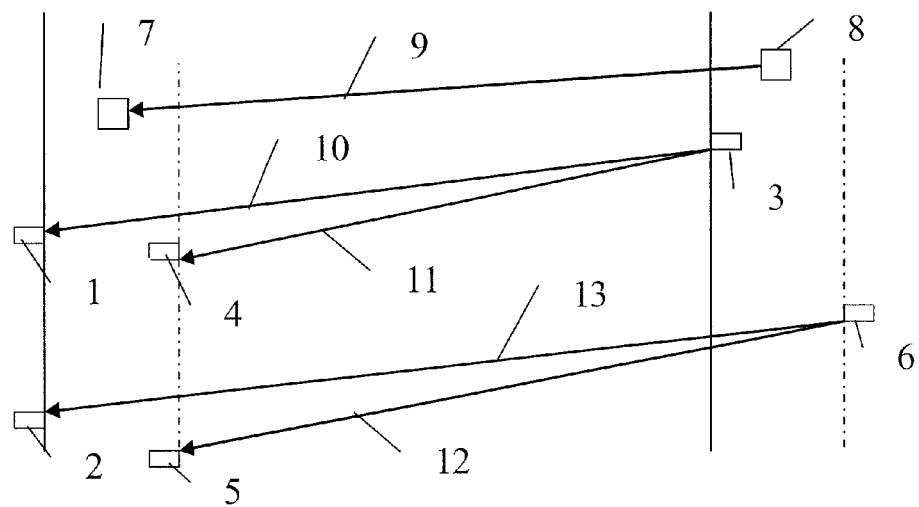
FIG.2 – PRIOR ART

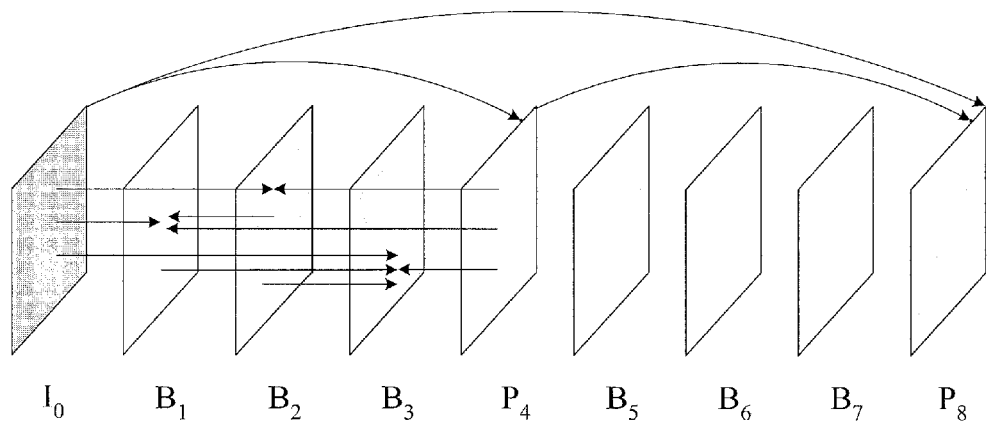
FIG.3 – PRIOR ART
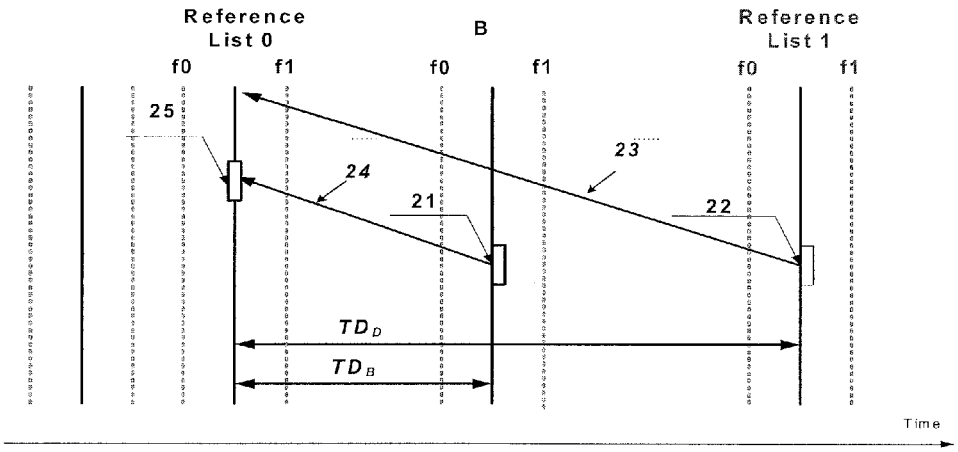
FIG.4

US 8,687,696 B2

DERIVATION OF FRAME/FIELD ENCODING MODE FOR A PAIR OF VIDEO MACROBLOCKS

This application claims the benefit, under 35 U.S.C. §365 of International Application PCT/EP2007/050959, filed Jan. 31, 2007, which was published in accordance with PCT Article 21(2) on Aug. 16, 2007 in French and which claims the benefit of French patent application No. 0650452, filed on Feb. 8, 2006.

BACKGROUND

1. Field of the Invention

The invention relates to a coding method by picture block of a video picture sequence.

2. Discussion of Related Art

The domain is that of video data compression. Of particular interest are the compression diagrams by blocks implementing an adaptive frame/field coding at macroblock level, better known by the abbreviation MBAFF (MacroBlock Adaptive Frame/Field). The standards concerned are for example the MPEG4 part 2 and MPEG4 part 10 standards.

"Block matching" type motion estimation is implemented in an encoder, to use the temporal correlation of the pictures in a sequence of pictures. It calculates pre-selected blocks subtracted from a current block for coding in inter mode. Owing to the different choices in the coding parameters proposed by the standards, for example the size of the picture block for motion estimation, the reference picture or the pictures from which motion estimations are made, the upper field, the lower field or the frame for these reference pictures etc., a selection being then made according to criteria such as coding cost, a significant amount of motion calculations must be realised by the encoder. These calculations are costly in terms of time and processing capacity. The motion estimators must be specific to the encoder or at least be compatible to the multitude of choices proposed in the standard and implemented by the encoder.

For example in the case of the H264 or MPEG4 part 10 standard, a motion vector field is calculated for each block size (4×4, 4×8, 8×4, 8×8, 8×16, 16×8, 16×16) and for each reference picture. FIG. 1 represents different types of a partition of 16 lines of 16 samples, for an encoder using this standard. The first line corresponds to a horizontal and vertical cut of a 16×16 sized macroblock respectively into two sub-macroblocks sized 16×8 and 8×16 and a cut into four 8×8 sized sub-macroblocks. The second line corresponds to these same block cuts but at a lower level, for an 8×8 sized sub-macroblock.

The term picture designates hereafter a picture frame or field. The picture frame is divided into two interlaced fields that are shown at different intervals. The first field in time, known as the upper field or odd field, appears on each odd line of the picture while the second field, known as the lower field or even field, appears on each even line of the picture. The two fields form the frame.

In the case of coding by macroblock pairs or adaptive frame/field coding or MBAFF coding, the motion estimator supplies, per macroblock, 1 motion vector field for the picture frame and 2 motion vector fields for the fields. FIG. 2 shows an example of such MBAFF coding.

16×16 macroblocks referenced 1 and 2 belong to a first upper field shown in vertical solid lines, and a 16×16 macroblock referenced 3 belongs to the next upper field shown in solid lines.

16×16 macroblocks referenced 4 and 5 belong to a first lower field shown in dotted lines, and a 16×16 macroblock referenced 6 belongs to the next lower field shown by a dotted line.

Macroblock pairs in frame mode, referenced 7 and 8, are constituted of two 16×16 macroblocks, each belonging to an interlaced picture or frame, and thus themselves constituted of a succession of lines of upper and lower fields, the first fields for the pair referenced 7 and the following fields for the pair referenced 8.

If the macroblock pair is coded in frame mode, reference 8, the associated: motion vector referenced 9 points to the preceding interlaced picture, designating a 16×32 macroblock pair referenced 7.

The macroblock pairs in field mode, referenced (1, 4), (2, 5) or (3, 6) are constituted of an upper macroblock containing the lines of the upper field or odd field and a lower macroblock containing the lines of the lower field or even field. If the macroblock pair (3, 6) is coded in field mode, the motion vector associated with the upper macroblock can point either to the macroblock of the upper field or preceding odd field, vector referenced 10, or to the macroblock of the lower field or preceding even field, vector referenced 11. The motion vector associated with the lower macroblock can point either to the macroblock of the preceding even pair, vector referenced 12, or to a macroblock of the preceding odd field, vector referenced 13. Hence, for a macroblock, 3 motion vectors are calculated, for a reference picture, for each of the 5 16×16, 16×8 and 8×16 sub macroblocks and the 9 blocks constituting the 4 8×8 sub macroblocks.

FIG. 3 shows an example of a portion of a sequence of video pictures numbered 1 to 8, according to the display order or temporal order. The pictures indexed 0 and 4, respectively the $I_0$ intra and $P_4$ predictive reference pictures, set 3 bi-predictive pictures $B_1$, $B_2$, $B_3$.

Still in the case of an encoder relying on the H264 or MPEG4 part 10 standard, the encoding process of bi-predictive pictures or B type pictures is more complex than that with P type predictive pictures. Type B pictures possess 2 lists of predictive pictures or reference pictures, called list 0 and list 1, giving rise to more calculations, while P type pictures only have one list, called list 0. Also, the number of coding modes for the B type macroblocks is greater such as bi-predictive mode, direct mode etc., accordingly increasing the complexity of the coding decision algorithm.

Hence, for the 16×16 size macroblocks, in multi-reference mode, the number of motion vectors is multiplied by the number of reference pictures.

The fact that in MBAFF mode, the coding mode decision, which may be based on the measurement of coding costs and the distortion associated with the mode, is made at the level of the macroblock pair and not at the level of the macroblock as for the MPEG2 standard, whereas correlations are calculated at the level of each macroblock, the possible combinations and the resulting calculation load are very high.

BRIEF SUMMARY OF THE INVENTION

One purpose of the invention is to overcome the disadvantages described above. The purpose of the invention is a coding method by picture blocks of a sequence of video pictures carrying out, at the level of a macroblock pair, selection of a coding mode from several intra or inter coding modes, the macroblock being able to be coded in field mode or in frames mode depending on whether it relates to respectively to a single field or to two fields, the macroblock coding of a bi-predictive type picture using at least two reference pictures, characterised in that the field mode or the frame mode is selected according to the following steps:

determination of a motion vector (23) associated with a co-located macroblock (22) of a macroblock to be coded (21) and being located in the next reference picture, the macroblock to be coded being predefined, for the selection, in field or frame mode, scaling (24) of the motion vector (23) according to the temporal distances between the reference pictures corresponding to this motion vector and between the current picture, field or frame according to the predefined mode, and a reference picture chosen from among the reference pictures corresponding to this motion vector, determination of the temporal macroblock (25) in the chosen reference picture, designated by the scaled motion vector (24) attributed to the macroblock to be coded (21), and of its coding mode, field or frame, selection of the field or frame coding mode of the temporal macroblock (25) for the coding of the current macroblock (21).

According to a particular implementation, the method is characterised in that the motion vector associated with the co-located macroblock is the motion vector associated with the block found at the top left of the partitioned macroblock.

According to a particular implementation, the method is characterised in that the motion vector associated with the co-located macroblock is the motion vector calculated during the determination of the coding mode and partitioning of this macroblock, for the block of dimension 16×16.

According to a particular implementation, the method is characterised in that the reference picture chosen is the preceding reference picture or the following reference picture closest to the current picture.

The method can be implemented in a bi-predictive type picture coding method according to the MPEG4 part 10 standard.

According to a particular implementation, the method is characterised in that the second reference picture is chosen from reference pictures corresponding to the motion vector, for a second scaling of the motion vector, so that a second temporal macroblock is determined in this second reference picture, from this second scaled motion vector, in that the inter picture difference is calculated between the current macroblock and each of the temporal macroblocks and that the current macroblock coding is carried out using, for the coding mode selection, the same field or frame coding mode as that of the temporal macroblock having the lowest inter picture difference.

According to a particular implementation, the method is characterised in that the field or frame coding mode is selected at the level of a pair of macroblocks, so that the selection is carried out for one of the macroblocks of the pair of macroblocks and that the selected mode is allocated to the two macroblocks of the pair.

According to a particular implementation, the method is characterised in that the field or frame coding mode is selected at the level of a pair of macroblocks, in that the selection is carried out for each of the macroblocks of the pair of macroblocks and in that, when the selected mode is different for the macroblocks, the coding mode retained for the macroblock pair is the mode which corresponds to the macroblock giving the lowest inter picture difference between the macroblock of the current pair and the corresponding temporal macroblock.

MBAFF provides a substantial gain in compression. Due to the invention, this functionality is used at a reasonable cost in terms of implementation by using the results of calculations already carried out in the reference pictures.

A pre-selection of the frame or field coding mode (MBAFF) is carried out at the level of each pair of macroblocks belonging to bi-predictive type pictures-(B slices). This pre-selection enables considerable reduction of the number of calculations to be carried out in the macroblock decision module enabling the choice of coding mode.

The proposed solution works on the principle that there is a continuity in the motion. It consists in not re-calculating the frame/field coding decision for the bi-predictive coding picture macroblocks but to recover this decision in the I type or P type macroblocks of the reference pictures, hence reducing the complexity of implementation of the adaptive frame/field coding for B type macroblocks.

BRIEF DESCRIPTION OF THE DRAWINGS

Other specific features and advantages will emerge clearly from the following description, the description provided as a non-restrictive example and referring to the annexed drawings wherein:

FIG. 1, the partitions of a macroblock and sub-macroblock,
    FIG. 2, an example of the MBAFF mode,
    FIG. 3, a type I, P and B picture sequence,
    FIG. 4, an example of the direct temporal mode.

DETAILED DESCRIPTION OF THE INVENTION

The coding modes of bi-predictive pictures use the predictive techniques described, for example, in the document ISO/IEC FCD 14496-10, paragraph 10, entitled "decoding process for B slices". It relates to the intra mode, to the direct mode, to the bi-predictive mode using the reference pictures from the list 0 and/or the list 1, to the predictive mode list 0 or list 1 using a picture from the list 0 or list 1. These predictive modes can be chosen separately for each of the sub-macroblocks or picture blocks of the macroblock to be coded.

This same paragraph 10 describes the direct prediction mode, for macroblocks belonging to a B type picture, that enables motion information not to be transmitted.

The "direct spatial" mode for example, consists in calculating a 16×16 predictor, vector motion associated with a macroblock of 16×16 pixels, by using the motion vectors of neighbouring macroblocks, while for example carrying out a median filtering of these neighbouring vectors.

The "direct temporal" mode consists, in one technique, in using the same block structure as that of the co-localised macroblock of the first picture in the list 1 of reference pictures. For each block of the current macroblock, the motion vectors of list 0 and list 1, that is the motion vectors pointing respectively in the reference picture of list 0 and the reference picture of list 1, are obtained by scaling the motion vectors of list 0 of the corresponding co-localised block.

FIG. 4 shows an example of use of a temporal direct mode for the selection of a MBAFF coding mode of a current macroblock referenced 21 of a bi-predictive current picture B. The vertical dotted lines noted as $f_0$ and $f_1$ represent the odd and even fields and the vertical full lines inside represent the corresponding frame picture. The various steps of the process are described hereafter:

The macroblocks of the type B picture can be coded, in cases where the frame/field adaptive mode exists, in field mode or in frame mode, also known respectively as field mode and picture mode.

The co-located macroblock, in the first reference picture stored in list 1 of reference pictures, that is the macroblock that is found at the same location, in this picture, as the current macroblock of the current picture, is referenced 22 on the figure. The motion vector myCol attributed to the co-localised macroblock, and enabling determination of the predictive macroblock in the reference picture of list 0, is referenced as 23. In the example of FIG. 4, the current macroblock and thus the co-localised macroblock are chosen in frame mode.

The motion vector mvL0 referenced 24 is calculated from the motion vector 23 attributed to the co-localised macroblock. 't involves a scaling of the motion vector of the co-localised macroblock:

$$mvL0 = DistScaleFactor * mvCol \text{ where}$$

DistScaleFactor=$TD_B/TD_D$, quotient of the temporal distance between the current picture and the reference picture passed by the temporal distance between the future reference picture and the past reference picture, myCol, motion vector of the first partition of the co-localised macroblock, corresponding to the block situated on the top right of the partitioned macroblock, numbered 0 in the standard.

This scaled mvL0 motion vector is then applied to the current macroblock to determine the position of the temporal macroblock 25 in the past reference picture of the list 0. The frame/field coding information relating to the coding of this temporal macroblock 25 is recovered to be used by the current macroblock.

Hence the idea consists in going to look for frame/field coding information in the macroblocks of reference pictures in the motion direction, so that there is no need to re-calculate it. The direct temporal prediction process enables recuperation of the frame/field coding mode in the macroblock pointed by the direct temporal motion vector.

The myCol motion vector is the motion vector associated with the co-located-macroblock. This macroblock is in fact partitioned into blocks as shown in FIG. 1 and one partition was retained for its coding with the motion vectors attributed to the blocks of the partition as mentioned above. The myCol vector associated with the macroblock is chosen as being the vector associated with block 0, that is the block at the top left of the macroblock. It is also conceivable to choose, as motion vector associated with the macroblock, among others, the motion vector calculated for the 16×16 block during the correlations operations, that is the coding mode selection operations of the co-located macroblock.

If the co-located macroblock has been coded in intra mode, then the pair of current macroblocks is encoded in accordance with the field or frame coding mode of the intra macroblock. The temporal direct prediction process did not take place.

The coding loop on the encoder, if it conforms to the H264 standard and thus supports the temporal direct mode, carries out all the necessary calculations in the realization of this algorithm, the process being in part similar to the temporal direct coding.

The previous reasoning was made while considering the current macroblock in frame mode. It would have been just as conceivable to start from a current macroblock in field mode. It is indeed a starting hypothesis to determine whether the current macroblock will be effectively coded in field mode. The motion vectors mvL0 are scaled according to this starting hypothesis, that is in taking into account the temporal distance between the reference picture used from list 0, field or frame and the field or frame of the current picture B corresponding to the chosen hypothesis, that is in frame or field mode of the current macroblock.

Also by hypothesis, the upper macroblock of the macroblock pair is chosen as current macroblock and the mode selected for this macroblock is applied to the lower macroblock of the pair of macroblocks. The determination of the field or frame coding mode is thus carried out, in the example given, at the level of a macroblock of a macroblock pair. A variant of the invention consists in reasoning at the level of the current macroblock pair for the selection of the field or frame coding mode. The pair of co-located macroblocks gives two motion vectors towards the reference picture of the list 0, one for each macroblock. There are then two temporal macroblocks for a pair of current macroblocks. The decision algorithm of the field or frame coding mode can then be the following:
- if the two temporal macroblocks are coded in the same field or frame coding mode, this mode is selected for the current macroblock pair.
- if the two temporal macroblocks are coded in different field or frame coding modes, the mode selected is that of the macroblock with the lowest inter picture difference.

A variant of the invention consists in not using the temporal macroblock in the reference picture of list L0 but rather in a reference picture of list L1. This is the macroblock pointed by the temporal prediction vector called mvL1, a vector pointing from the current macroblock to the picture closest to the current picture and belonging to list 1 of the reference pictures and obtained by scaling the vector associated with the co-located macroblock: mvL1=$(TD_D-TD_B)/TD_D$*mvCol.

Another variant consists in using the frame/field coding mode of the co-located macroblock or the coding mode of the macroblock pointed by one of the motion vectors calculated in the coding loop during the coding of the co-located macroblock. For example it is possible to select the coding mode for the macroblock pointed by the motion vector calculated for the inter mode of the 16×16 co-located block, field or frame vector.

It is also possible to take account of the coding modes of the macroblock designated by the motion vector mvL0 and the macroblock designated by the motion vector mvL1 to decide field/frame coding mode of the current macroblock.

Another possibility consists in taking account of the coding modes of the co-located macroblock and of the macroblock designated by a motion vector 23 associated with a co-located macroblock in a reference picture of the list L0. The decision algorithm of the field or frame coding mode can then be the following:
- if the two macroblocks are coded in the same field or frame coding mode, this mode is selected for the current macroblock pair.
- if the two macroblocks are coded in different field or frame coding modes, the mode selected is that of the macroblock with the lowest inter picture difference.

One variant consists in, on the basis of the direct temporal prediction process, using a combination of mvL1 and mnL0 vectors to implement the procedure. For example, it is possible to choose the frame or field coding type according to the zone pointed to by the mvL1 motion vector or the mvL0 motion vector, choosing that which provides the lowest inter-picture difference, also called residue.

The invention claimed is:

1. Coding method by picture blocks of a sequence of video pictures carrying out, at the level of a macroblock pair, selection of a coding mode from a field mode or a frame mode depending on whether it relates respectively to a single field or to two fields, the macroblock coding of a bi-predictive type picture using at least two reference pictures, wherein the field mode or the frame mode is selected according to the following steps:
   determination of a motion vector associated with a co-located macroblock of a macroblock to be coded and being located in the next reference picture, the macroblock to be coded being predefined, for the selection, in field or frame mode, scaling of the motion vector according to the temporal distances between the reference pictures corresponding to this motion vector and between the current picture, field or frame according to the predefined mode, and a reference picture chosen from among the reference pictures corresponding to this motion vector, determination of the temporal macroblock in the chosen reference picture, designated by the scaled motion vector attributed to the macroblock to be coded, and of its coding mode, field or frame, selection of the field or frame coding mode of the temporal macroblock designated by the scaled motion vector for the coding of the current macroblock.

2. Coding method according to claim 1, wherein the motion vector associated with the co-located macroblock is the motion vector associated with the block found at the top left of the partitioned macroblock.

3. Coding method according to claim 1, wherein the motion vector associated with the co-located macroblock is the motion vector calculated-for the block of dimension 16×16.

4. Coding method according to claim 1, wherein the reference picture chosen is the preceding reference picture or the following reference picture closest to the current picture.

5. Coding method according to claim 1, wherein it is carried out in a method for coding a bi-predictive type picture according to the MPEG4 part 10 standard.

6. Coding method according to claim 1, wherein a second reference picture is chosen from the reference pictures corresponding to the motion vector, for a second scaling of the motion vector, wherein a second temporal macroblock is determined in this second reference picture, from this second scaled motion vector, in that the inter picture difference is calculated between the current macroblock and each of the temporal macroblocks and wherein the coding of the current macroblock is carried out using, for the coding mode selection, the same field or frame coding mode as that of the temporal macroblock having the lowest inter picture difference.

7. Method according to claim 1, wherein the field or frame coding mode is selected at the level of a pair of macroblocks, wherein the selection is carried out for one of the macroblocks of the pair of macroblocks and wherein the selected mode is allocated to the two macroblocks of the pair.

8. Method according to claim 1, wherein the field or frame coding mode is selected at the level of a pair of macroblocks, wherein the selection is carried out for each of the macroblocks of the pair of macroblocks and in that, when the selected mode is different for the macroblocks, the coding mode retained for the macroblock pair is that which corresponds to the macroblock giving the lowest inter picture difference between the macroblock of the current pair and the corresponding temporal macroblock.

* * * * *